United States Patent
Cheng et al.

(10) Patent No.: US 9,578,889 B2
(45) Date of Patent: Feb. 28, 2017

(54) METHOD FOR PRODUCING LOW-ASH POULTRY PLASMA PROTEIN POWDER BY UTILIZING POULTRY BLOOD

(71) Applicant: SHANGHAI GENON BIOLOGICAL PRODUCT CO., LTD, Shanghai (CN)

(72) Inventors: Guoxiang Cheng, Shanghai (CN); Guoyong Jiang, Shanghai (CN); Wei Yu, Shanghai (CN); Yong Pan, Shanghai (CN); Jun Zhang, Shanghai (CN); Daming Zhu, Shanghai (CN); Minggang Liu, Shanghai (CN); Kaibao Xiong, Shanghai (CN)

(73) Assignee: Shanghai Genon Biological Product Co., Ltd., Shanghai (CN)

( * ) Notice: Subject to any disclaimer, the term of this patent is extended or adjusted under 35 U.S.C. 154(b) by 212 days.

(21) Appl. No.: 14/384,010

(22) PCT Filed: Mar. 8, 2013

(86) PCT No.: PCT/CN2013/072366
§ 371 (c)(1),
(2) Date: Sep. 9, 2014

(87) PCT Pub. No.: WO2013/131494
PCT Pub. Date: Sep. 12, 2013

(65) Prior Publication Data
US 2015/0056363 A1  Feb. 26, 2015

(30) Foreign Application Priority Data
Mar. 9, 2012 (CN) .......................... 2012 1 0062535

(51) Int. Cl.
*A23J 1/06* (2006.01)

(52) U.S. Cl.
CPC .................. *A23J 1/06* (2013.01); *A23K 10/24* (2016.05); *A23K 20/147* (2016.05); *A23K 20/20* (2016.05); *A23K 50/30* (2016.05); *A23K 50/60* (2016.05); *A23L 33/17* (2016.08)

(58) Field of Classification Search
CPC ....................................................... A23J 1/06
See application file for complete search history.

(56) References Cited

U.S. PATENT DOCUMENTS 6,663,780 B2 *  12/2003  Heikkila .............. B01D 15/185
127/46.2

FOREIGN PATENT DOCUMENTS

CN         1315139         10/2001
CN        101124938         2/2008
(Continued)

OTHER PUBLICATIONS

Yu et al. (CN 102318722 (A)—Espacenet machine translation.*
(Continued)

*Primary Examiner* — Elizabeth Gwartney
(74) *Attorney, Agent, or Firm* — Hamre, Schumann, Mueller & Larson, P.C.

(57) ABSTRACT

The present invention relates to a method for producing low-ash poultry plasma protein powder by utilizing poultry blood. Specifically, the method of the present invention comprises the steps of: mixing the poultry blood with an anticoagulant to obtain anticoagulated whole blood; centrifugally separating the anticoagulated whole blood to obtain plasma liquid; de-calcifying the plasma liquid via a precipitation reaction, ultra-filtrating the plasma liquid via a ultra-filtration membrane, emulsifying, and nano-filtrating to obtain the concentrated plasma liquid; and drying the concentrated plasma liquid to obtain the poultry plasma protein powder. The method of the present invention effec- (Continued)

tively overcomes the defect of difficult poultry blood deep processing, achieves the recycling of poultry blood resource, avoids wasting resources, and reduces environmental pollution; and the produced plasma protein powder has the advantages of high protein content, good palatability, balanced amino acid and the like.

12 Claims, 1 Drawing Sheet

(56) References Cited

FOREIGN PATENT DOCUMENTS

| CN | 101849612 | 10/2010 |
|----|-----------|---------|
| CN | 102010459 | 4/2011 |
| CN | 102132760 | 7/2011 |
| CN | 102210372 | 10/2011 |
| CN | 102318722 | 1/2012 |
| CN | 102599332 | 7/2012 |

OTHER PUBLICATIONS

Cui et al. (CN 101849612 (A)—Espacenet machine translation.*
Durham et al., "Waste management and co-product recover in dairy processing", Chapter 14 in Handbook of Waste management and Co-Product Recover in Food Processing, vol. 1, Ed. Keith W. Waldron, CRC Press, 2007, pp. 332, 362.*
Park et al., "Oil/Water Separation Using Nanofiltration Membrane Technology"—Separation Science and Technology, vol. 36, Issue 7, 2001, pp. 1527-1542—Abstract only.*

* cited by examiner

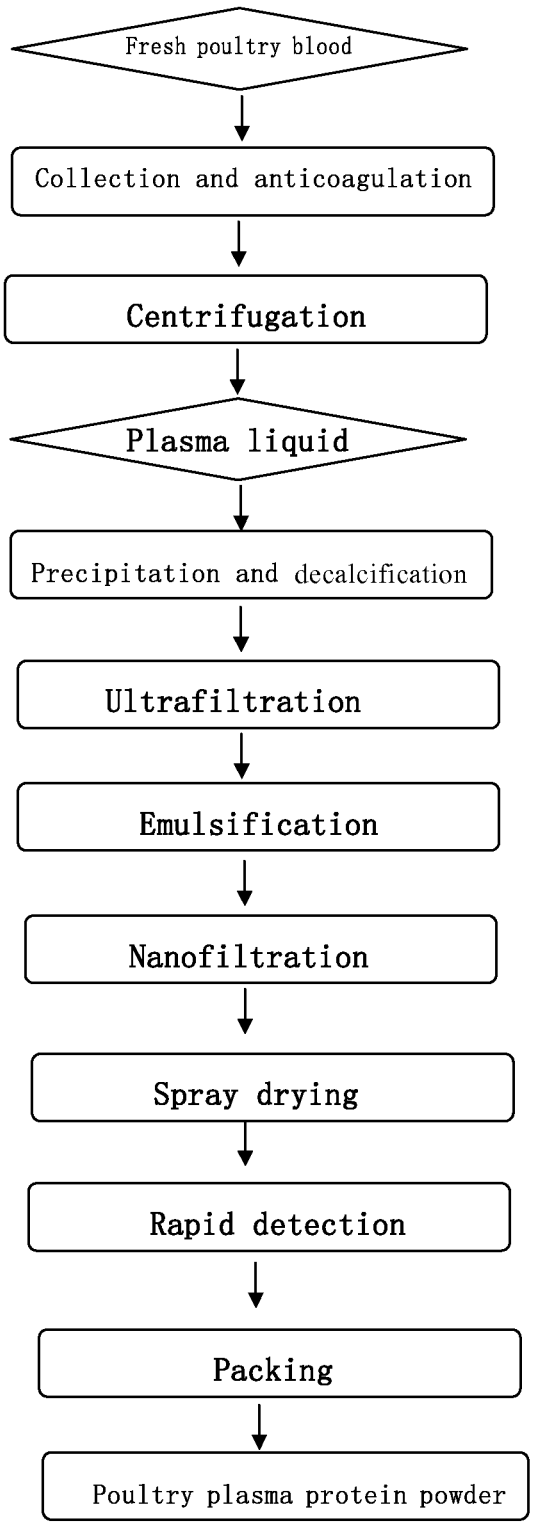

METHOD FOR PRODUCING LOW-ASH POULTRY PLASMA PROTEIN POWDER BY UTILIZING POULTRY BLOOD

FIELD OF THE INVENTION

The invention relates to the field of biotechnology and modern agriculture; and, in particular, to a method for producing low-ash poultry plasma protein powder by utilizing poultry blood.

BACKGROUND OF THE INVENTION

The butchery grows rapidly in China. A large amount of byproducts such as blood are produced, while poultry is slaughtered for producing meat food. According to statistics, the total amount of poultry blood in China is more than one million tons per year, which at least can be used to produce about 130,000 tons of animal protein powder products. However, due to some problems, such as insufficiency of poultry blood slaughter methods, high calcium content, easy quick-setting, high viscosity and low dry matter content etc, no effective means for poultry blood processing and utilization is available at home and abroad. Because of some reasons, such as lack of large-scale intensive processing technology, these protein resources are not reasonably used, resulting in a huge waste of large amount of high-quality protein resources.

At present, there is a serious lack of protein resources in China, 75% of soybean meal production depends on import, and 70% of fish powder production depends on import. The high dependent on imports of protein materials is the bottleneck restricting the development of animal husbandry industry chain in China. The purpose of $12^{th}$ five-year development plan of feed industry in China is to build demonstration bases in which high quality protein is produced through deep processing by using animal processing by-products.

Consequently, there is an urgent need to develop deep processing methods of poultry blood resources, especially the method for preparing the poultry plasma protein powder.

DESCRIPTION OF THE INVENTION

The objective of the present invention is to provide a method for producing low-ash poultry plasma protein powder by utilizing poultry blood.

The other objective of the present invention is to provide a high protein content, low-ash poultry plasma protein powder and use thereof.

In the first aspect of the present invention, a preparation method for high protein content, low-ash poultry plasma protein powder is provided, which includes the following steps:

(a) Mixing the poultry blood with anticoagulant, so as to obtain anti-coagulated whole blood;

(b) Centrifuging the anti-coagulated whole blood obtained in step (a) to collect the light liquid, so as to obtain the plasma liquid;

(c) Adding decalcifying agent into the plasma liquid obtained in step (b), and conducting precipitation reaction, so as to obtain precipitated plasma reaction liquid;

(d) Removing the precipitate by centrifuging the plasma reaction liquid obtained in step (c), decalcified plasma liquid;

(e) Ultrafiltration-processing the decalcified plasma liquid obtained in step (d) using an ultrafiltration membrane, and collecting the filtrate, so as to obtain ultrafiltration-processed plasma liquid;

(f) Adding emulsifier to the ultrafiltration-processed plasma liquid obtained in step (e), so as to obtain the emulsified plasma liquid;

(g) Subjecting the emulsified plasma liquid obtained in step (f) to nano-filtration to obtain a plasma concentrate;

(h) Drying the plasma concentrate obtained in step (g), so as to obtain poultry plasma protein powder.

In another preferred embodiment, the poultry blood comes from poultry or birds.

In another preferred embodiment, the poultry are selected from chicken, duck, or goose; the birds are selected from pigeon or sparrow.

In another preferred embodiment, in step (a), the anticoagulant is sodium citrate, and the amount of added anticoagulant is 0.1~5% (w/w) of the total blood.

In another preferred embodiment, the amount of added anticoagulant is 0.4~2% (w/w) of the total blood; Preferably, 0.5~1% (w/w); more preferably, 1% (w/w).

In another preferred embodiment, in step (a), the anticoagulant is prepared as aqueous anticoagulant solution with the concentration of 8~15 wt %, and then the aqueous anticoagulant solution is mixed with poultry blood, so as to obtain the anticoagulated whole blood.

In another preferred embodiment, the water for preparing the anticoagulant is pure water, or the water filtered through 200 molecular weight nanofiltration membrane (water permeating the membrane).

In another preferred embodiment, there is a step between step (a) and step (b): the anticoagulated whole blood is prefiltration-treated to remove impurities such as hair, stones and so on, so as to obtain the pre-filtered anticoagulated whole blood.

In another preferred embodiment, the centrifugation process in step (b) uses tube centrifuge; and/or the centrifugation process in step (d) uses disc centrifuge.

In another preferred embodiment, the centrifugal speed of the centrifugation process in step (b) is 6000-16000 r/min, preferably of 11,000 r/min.

In another preferred embodiment, the centrifugal speed of the centrifugation process in step (d) is 8000-15000 r/min, preferably of 11,000 r/min.

In another preferred embodiment, step (b) further comprises the following step: the separated plasma is cryopreserved, and the temperature for cryoprerservation is 2~10° C.; preferably 4° C.

In another preferred embodiment, the decalcifying agent in step (c) comprises a water-soluble carbonate (e.g. sodium carbonate, potassium carbonate, ammonium carbonate, or a combination thereof); and/or In step (c), the amount of added decalcifying agent is 0.02~0.5% (w/w) of the plasma liquid obtained in step (c) (preferably 0.05~0.3% (w/w), more preferably 0.01% (w/w)); and/or In step (f), the amount of added emulsifier is 0.01~0.5% (w/w) of the plasma liquid obtained in step (e); and the emulsifier is selected from: fatty acid monoglyceride, sorbitol ester, soybean phospholipid, or a combination thereof; and/or In step (h), when drying, spray-drying is used, and the inlet air temperature is 220° C.~230° C., while the outlet air temperature is 80° C.~85° C.

In another preferred embodiment, in step (c), the time of precipitation reaction is 0.5~4 hours.

In another preferred embodiment, in step (c), the sodium carbonate is prepared as the aqueous solution with the concentration of 20 wt %, and then is slowly added into the plasma liquid.

In another preferred embodiment, the amount of added emulsifier is 0.01~0.1% (w/w) of the plasma liquid obtained in step (e); and the emulsifier is sorbitol ester.

In another preferred embodiment, in step (e), the ultrafiltration membrane is an ultrafiltration membrane with molecular weight of 300,000~500,000; and/or In step (g), nanofiltration is preformed using a nanofiltration membrane with molecular weight of 200-1000, the volume ratio of plasma concentrate to filtrate is 1:2~4, and the plasma concentrate is collected.

In another preferred embodiment, in step (e), the ultrafiltration membrane is an ultrafiltration membrane with molecular weight more than 300,000.

In another preferred embodiment, in step (e), the ultrafiltration membrane is an ultrafiltration membrane with molecular weight of 350,000-500,000.

In another preferred embodiment, the ultrafiltration membrane is an ultrafiltration membrane with molecular weight of 400,000.

In another preferred embodiment, the nanofiltration membrane is a nanofiltration membrane with molecular weight of 200~500; preferably, with molecular weight of 200.

In another preferred embodiment, the method further includes the following step: mixing the dried plasma protein powder and the component selected from: cereals, maize, soybeans and whey, to obtain granular feed.

In the second aspect of the present invention, a poultry plasma protein powder is provided. In the protein powder, the content of protein is $\geq 70\%$, immunoglobulin content is $\geq 14\%$, and ash content is $\leq 15\%$.

In another preferred embodiment, the content of protein is 70~78%; immunoglobulin content is 14~30%; and ash content is 8~15%.

In another preferred embodiment, the plasma protein powder is prepared by the method according to the first aspect of the present invention.

In the third aspect of the present invention, the use of the protein powder according to the second aspect of the present invention is provided, which can be used to prepare feed composition or food composition.

It should be understood that in the present invention, the technical features specifically above and below (such as the Examples) can be combined with each other, thereby constituting a new or preferred technical solution which needs not be individually described.

DESCRIPTION OF FIGURES

FIG. 1 shows the flow diagram for preparing plasma protein powder using poultry blood.

DETAILED DESCRIPTION OF THE INVENTION

Through comprehensive and intensive research, the inventors have unexpectedly discovered a method for preparing low-ash poultry blood plasma protein powder. Based on treatments such as anticoagulation, centrifugation etc., the difficulty of nanofiltration for poultry blood is effectively resolved by the method through decalcification precipitation, and removing fibrinogen and most of the oil and residual oil from emulsification by ultrafiltration, thereby facilitating the subsequent operations, and significantly improving the efficiency of the whole preparation process. The plasma protein powder prepared by the method has many advantages such as high protein content (especially immunoglobulin content), low ash, palatability, and balanced amino acid, etc., and it is ideally suitable for feed and food. Based on the above findings, the present invention is accomplished.

DEFINITION

At present, "poultry", also known as bird species, includes birds and domestic poultry, such as, but not limited to, chickens, ducks, geese, pigeons, sparrows and so on. Preferably, poultry is domestic poultry.

Preparation Method

Poultry plasma protein powder with the high protein content and low ash can be obtained by the method for preparing (or processing) poultry blood plasma protein powder according to the present invention by using blood poultry processing byproducts as raw materials, and anticoagulation, ultrafiltration, emulsion, nanofiltration and spray drying technologies.

In particular, it includes the following steps:

(a) Mixing the poultry blood with anticoagulant, so as to obtain anti-coagulated whole blood;

(b) Centrifuging the anti-coagulated whole blood obtained in step (a) to collect the light liquid, so as to obtain the plasma solution;

(c) Adding decalcifying agent into the plasma liquid obtained in step (b), and conducting precipitation reaction, so as to obtain precipitated plasma reaction liquid;

(d) Removing the precipitate by centrifuging the plasma reaction liquid obtained in step (c), so as to obtain decalcified plasma liquid;

(e) Ultrafiltration-processing the decalcified plasma liquid obtained in step (d) using an ultrafiltration membrane, and collecting the filtrate, so as to obtain ultrafiltration-processed plasma liquid;

(f) Adding emulsifier to the ultrafiltration-processed plasma liquid obtained in step (e), so as to obtain the emulsified plasma liquid;

(g) Subjecting the emulsified plasma liquid obtained in step (f) to nano-filtration to obtain a plasma concentrate;

(h) Drying the plasma concentrate obtained in step (g), so as to obtain poultry plasma protein powder.

Raw Materials

The blood in the present invention comes from the poultry, including domestic poultry and birds. It should be appreciated by the skilled person in the art, that the components in the poultry blood are very similar, therefore, any poultry is included in the invention. Blood from various poultry can be used as raw materials in the preparation method for producing poultry blood protein powder in the present invention. The poultry, includes, but not limited to: chickens, ducks, geese, pigeons, sparrows and so on. Preferably, domestic poultry is used. Preferably, fresh and healthy poultry blood is used as the raw materials for producing low ash plasma protein powder.

Plasma and hemocyte can be separated from the blood through technology well known to those skilled in the art, for example, the anticoagulated whole blood can be separated to obtain plasma liquid and hemocyte liquid, and then the plasma liquid can be processed as raw materials for producing the plasma protein powder.

Poultry Blood Anticoagulation

Anticoagulation treatment in the present invention may be performed by technology well known to those skilled in the art. For example, poultry blood can be mixed with anticoagulant to get anticoagulated whole blood. Preferably, the anticoagulant may be prepared as 8~15 wt % aqueous anticoagulant solution, and the poultry blood is mixed with the aqueous anticoagulant solution, thereby obtaining anticoagulated whole blood; wherein the water used for preparing aqueous anticoagulant solution can be pure water, or water filtered through the 200-molecular weight nanofiltration membrane (water permeating the membrane is used).

The amount of added anticoagulant may be determined according to the properties of the poultry blood raw material (e.g., the degree of difficulty in anticoagulation). Preferably, the amount of added anticoagulant is 0.1~5% of total blood (w/w); more preferably, 0.4~2% (w/w), most preferably, 1% (w/w).

Preferably, the anticoagulation treatment is conducted according to the following steps:

Anticoagulant is dissolved into water according 8~15% by weight (w/w) to obtain the aqueous anticoagulant solution; the aqueous anticoagulant solution is charged into a spray container; the aqueous anticoagulant solution is mixed with the poultry blood, wherein the amount of added aqueous anticoagulant solution is 1~30% of poultry blood (v/v) (preferably 5~15% (v/v)), or the amount of added aqueous anticoagulant solution is 0.1~5% of the total amount of whole blood (w/w); and the resulting mixture is stirred so that the aqueous anticoagulant solution is mixed evenly with poultry blood.

Centrifugal Separation

After collecting the anticoagulated whole blood from the blood pool obtained in the above step, the anticoagulated whole blood is preferably prefiltration-treated (e.g. through filter bag) to remove impurities such as hair, stones and so on, and then is centrifuged by using blood tube centrifuge (e.g. the rotation speed is 8000-15000 rpm/min, preferably 11000 rpm/min), so as to obtain light liquid, i.e., the poultry plasma liquid. Preferably, the anticoagulated poultry blood is centrifuged immediately upon prefiltration-treatment.

Upon anticoagulation and centrifugation separation, the poultry blood can not be immediately subjected to subsequent separation and purification, and it is necessary to be cyropreserved. Preferably, the separated plasma liquid and hemocyte liquid are cyropreserve, respectively at storage temperature of 1-10° C. (preferably 4° C.).

Plasma Decalcification

Decalcifying agent is added into the plasma liquid obtained in the above step, said decalcifying agent includes water soluble calcium carbonate (such as sodium carbonate, potassium carbonate, ammonium carbonate, or a combination thereof), the amount of added decalcifying agent is 0.02~0.5% (w/w) of the plasma liquid obtained in the above step for neutralizing free calcium ions in the plasma and producing calcium carbonate precipitate, and this precipitate is removed by centrifugation.

Plasma Ultrafiltration

The poultry plasma liquid obtained in the above step is subjected to ultrafiltration, and the ultrafiltration may be carried out in accordance with routine operation in the art, for example, ultrafiltration is conducted by using a filter membrane with molecular weight of 300,000~500,000 (preferably a filter membrane with molecular weight of 400,000) for removing fibrinogen and most of the oil, and filtrate is collected, thereby obtaining the ultrafiltered plasma.

In the present invention, modern biofilm technology is adopted, and the ultrafiltration membrane with molecular weight of 300,000~500,000 is used for ultrafiltration, thereby achieving the removal of poultry blood fibrinogen and some oil, and overcoming the problems such as high viscosity of poultry blood and the difficulty of nanofiltration for poultry blood.

Emulsification

The steps of emulsification are routine operation steps, for example, the emulsifier is added into the plasma obtained in the above step to emulsify residual oil, and an emulsifier is selected from the group consisting of: fatty acid monoglyceride, sorbitol ester, soybean phospholipids, preferably sorbitol ester.

The amount of added emulsifier can be determined by the oil content of plasma liquid. Preferably, the amount of added emulsifier is 0.01~0.5% (or 0.05~0.1%) (w/w) of the plasma liquid obtained in the above step.

Plasma Nanofiltration

The emulsified plasma liquid obtained in the above step is subjected to nanofiltration, wherein the nanofiltration may be carried out according to routine operation in the art, for example, the emulsified plasma is concentrated by using a membrane with molecular weight of 200-1000 (preferably molecular weight of 200) through nanofiltration, resulting in the volume ratio of concentrated plasma to filtrate as 1:1~6 (preferably from 1:2~4 or 1:3~4), and most of water and salts in the plasma is removed, thereby obtaining plasma concentrate.

According to the present invention, by nanofiltration concentration, the dry matter content in the poultry plasma liquid can be increased, and the cost for drying the plasma can be greatly reduced.

Drying

Finally, the plasma concentrate obtained in the above step is dried, and the drying may be carried out by operation commonly used by the skilled in the art, preferably spray-drying, wherein the inlet temperature may be 220° C.~230° C., while outlet temperature may be 80° C.~85° C.

The method of the present invention will be further illustrated based on FIG. 1 in combination with preferred embodiments:

(1) The aqueous anticoagulant solution prepared according to a weight ratio of anticoagulant to water of 8~15% by weight (w/w) is added into the collected poultry blood, the amount of added aqueous anticoagulant solution is 5~20% of poultry blood (v/v), the resulting mixture is stirred, so that the aqueous anticoagulant solution is mixed evenly with the poultry blood, thereby obtaining the anticoagulated whole blood.

(2) The anticoagulant poultry blood is collected, filtered though filter-bag, separated by tube centrifuge (11000 rpm/min), thereby obtaining light liquid, which is poultry plasma liquid and stored at 4° C.

(3) Sodium carbonate solution (such as 20 wt % aqueous sodium carbonate solution) is added into the plasma liquid stored at 4° C., and the resulting mixture is stirred for 0.5~4 hours, for conducting precipitation reaction.

(4) Upon precipitation, the plasma reaction liquid is centrifuged by a disc centrifuge, for removing the precipitate and obtaining decalcified plasma liquid.

(5) The decalcified plasma liquid is subjected to ultrafiltration using a filter membranes with molecular weight of 300,000~500,000 to remove the fibrinogen and most of oil, thereby obtaining the plasma filtrate.

(6) A emulsifier is added into the plasma filtrate to emulsify residual oil, wherein the amount of added emulsifier is 0.02~0.1% (w/w) of the plasma filtrate of step (5), thereby obtaining emulsified plasma.

(7) Emulsified plasma is concentrated through nanofiltration using a membrane with molecular weight of 200, according to the volume ratio of 1:2~4 (i.e. concentrated plasma: filtered water) (preferably 1:3~4), for removing most of water and salts, thereby obtaining plasma concentrate.

(8) Upon nanofiltration, the poultry plasma liquid is spray-dried, wherein the inlet air temperature is controlled at 220~230° C., and outlet temperature is controlled at 75~90° C. Upon spray-drying, testing, and packaging, the poultry blood plasma protein powder is obtained.

Plasma Protein Powder

The poultry blood plasma protein powder provided by the present invention possesses excellent indicators, wherein the protein content is up to above 70%, in which the functional components, immune globulin (such as IgY) account for 14%, palatability is good, there is a balanced amino acid, ash content is lower than 15%, moisture content is not more than 9%, and salt content is less than 2.6%.

Use

The poultry blood plasma protein powder provided by the present invention can be used in fields such as feed and food and the like. For example, the dried plasma protein powder can be mixed with the components selected from the group consist of: cereals, maize, soybeans and whey, to obtain a granular feed composition or food composition, for feeding weaned pups.

During the process of the poultry blood plasma protein powder provided in the present invention, the content of salts is greatly reduced, while the activities of the various functional immunoglobulins in original plasma are retained. When applied to the feed, it can effectively prevent the infection in the intestine of fed pups animals, reduce immune stimulation, and improve nutrition metabolism and immunity levels of weaned pups. It can be used as feed composition in creep feed and nursing feed; and also be used in food composition.

THE MAIN ADVANTAGES OF THE PRESENT INVENTION

1. It provided a preparation method for low-ash poultry blood plasma protein powder. For the first time, poultry blood is used as a raw material to produce poultry blood plasma protein powder. The present invention overcomes the defect of poultry blood as unsuitable for deep-processing, thereby producing a low ash, high protein content (especially immunoglobulin) plasma protein powder, and takes the lead in processing and preparing poultry blood plasma protein powder of high-level nutritional quality from poultry blood at home and abroad.

According to the method, calcium ion in plasma is removed from the obtained anticoagulated poultry plasma by precipitation reaction; fibrinogen is removed through ultrafiltration and oil is emulsified, thereby preventing blood from clotting and blocking the nanofiltration membrane; desalinization and concentration are performed through nanofiltration, thereby effectively reducing the ash content in plasma, increasing the effective index such as crude plasma protein; the used concentration processes greatly reduce the cost of drying; and high-pressure spray-drying technology is used to ensure the uniformity of the particles of poultry plasma product, and other good indicators.

According to the method of the present invention, ultrafiltration membrane with specific molecular weight range is used for ultrafiltration. Upon ultrafiltration, filtrate is taken for subsequent steps, thereby significantly improving the yield of final product.

It is indicated in the prior art that chicken plasma can be ultrafiltered using ultrafiltration membrane with molecular weight of 0.1~300000 and used for the preparation of chicken blood plasma protein powder, however, it is not specified that whether the filtrate or retension liquid is used upon ultrafiltration, and the inventors have proved that the yield of final product prepared according to the prior art is low.

2. Indicators of the poultry blood plasma protein powder prepared by the method of the present invention are excellent, wherein the protein content is up to above 70%, in which the functional components of immune globulin (such as IgY) account for 14%, palatability is good, there is a balanced amino acid, ash content is lower than 14.5%. The indexes of poultry plasma protein powder of the present invention are good, which is in the leading domestic level.

3. In the feeding experiment of adding poultry plasma protein powder into weanling pig diets and the comparison experiment of adding plasma protein powder into weanling pig diets, the poultry plasma protein powder prepared in the present invention produces the best feeding effects, improving the nutritional metabolism and immunity level of weaned piglets.

The present invention will be further illustrated below with reference to specific examples. It should be understood that these examples are only to illustrate the present invention but not to limit the scope of the present invention. For the experimental methods without particular conditions in the following examples, they are generally performed under conventional conditions or as instructed by the manufacturer.

The detection methods for the indicators in the present invention (such as the content of protein (including IgY), ash, moisture, or salt in poultry blood plasma protein powder; or immunoglobulin (IgG) content of rearing piglets) and the calculation of feed-gain ratio of rearing piglets feed are methods well known by ordinary skilled in the art.

EXAMPLE 1

Preparation of Poultry Blood Plasma Protein Powder 1

(1) 100 kg of anticoagulant (sodium citrate) and 800 kg of water were mixed to prepare the aqueous anticoagulant solution, and the aqueous anticoagulant solution was added into 10 tons of chicken blood with stirring, so that the aqueous anticoagulant solution was sufficiently mixed with poultry blood to homogeneity.

(2) After collecting the anticoagulated poultry blood from the blood pool, the poultry blood was filtered through filter bag to remove impurities such as hair, stones and the like, and then was centrifuged by using blood tube centrifuge (11000 rpm/min), so as to obtain light liquid, i.e., the plasma liquid.

(3) 10 kg of sodium carbonate (decalcifying agent) was dissolved in 50 kg of water, thereby making sodium carbonate aqueous solution, the solution was slowly added into the plasma liquid, wherein the amount of added sodium carbonate was 0.1% (w/w) of the plasma liquid obtained in the previous step, and the resulting mixture was stirred for 1 hour for precipitation reaction.

(4) Upon precipitation reaction, plasma reaction liquid was centrifuged by a disc centrifuge (11000 rpm/min) for removing the precipitate, thus obtaining decalcified plasma liquid.

(5) The decalcified plasma liquid was subjected to ultrafiltration using a filter membrane with molecular weight of 400,000 to remove fibrinogen and most of the oil, thereby obtaining the plasma filtrate.

(6) Emulsifier (sorbitol ester) was added into the plasma filtrate to emulsify residual oil. The amount of added emulsifier was 0.1% (w/w) of the plasma obtained in the previous step, thus obtaining the emulsified plasma.

(7) The emulsified plasma was concentrated through nanofiltration by using a membrane with molecular weight of 200 to obtain the concentrated plasma, wherein the volume ratio of the concentrated plasma vs filtrate water was 1:3; and most of the water and salts was removed, thus obtaining the concentrated plasma liquid.

(8) The concentrated plasma liquid was spray-dried, wherein the inlet air temperature was controlled at 220~230° C., and the outlet air temperature was controlled at 80~85° C., thereby obtaining the low ash poultry blood plasma protein powder, i.e. plasma protein powder 1.

The result: using the above method, about 610 kg of poultry plasma protein powder 1 was obtained from 10 tons of poultry blood, and the product indexes are shown in Table 1:

TABLE 1

| poultry plasma protein powder 1 | | | | |
|---|---|---|---|---|
| Protein | IgY | Ash | Moisture | Salt |
| 70.4% | 14.2% | 14.4% | 8.8% | <2.6% |

EXAMPLE 2-3

Preparation of Poultry Blood Plasma Protein Powder 2-3

The preparation method was the same as that in Example 1, while the specific conditions are described in Table 2. Wherein the amount of added decalcifying agent was determined by the total weight (w/w) of plasma (liquid) obtained in Example step (2); the amount of added emulsifier agent was determined by the total weight (w/w) of plasma (liquid) obtained in Example step (5).

into 1 ton of chicken blood with stirring, so that the aqueous anticoagulant solution was sufficiently mixed with poultry blood to homogeneity.

(2) After collecting the anticoagulated poultry blood from the blood pool, the poultry blood was filtered through filter bag to remove impurities such as hair, stones and the like, and then was centrifuged by using blood tube centrifuge (11000 rpm/min), so as to obtain light liquid, i.e., the plasma liquid.

(3) 0.5 kg of sodium carbonate and 0.7 kg of ammonium carbonate were used as decalcifying agent, the decalcifying agent was dissolved in 5 kg of water, thereby making the decalcification solution, and the solution was slowly added into the plasma liquid, wherein the amount of added decalcifying agent was 0.12% (w/w) of the plasma liquid obtained in the previous step, and the resulting mixture was stirred for 1 hour for precipitation reaction.

(4) Upon precipitation reaction, plasma reaction liquid was centrifuged by a disc centrifuge (11000 rpm/min) for removing the precipitate, thus obtaining decalcified plasma liquid.

(5) The decalcified plasma liquid was subjected to ultrafiltration using a filter membrane with molecular weight of 500,000 to remove fibrinogen and most of oil, thereby obtaining the plasma filtrate.

(6) Emulsifier (sorbitol ester: fatty acid monoglyceride=1:1) was added into the plasma filtrate to emulsify residual oil. The amount of added emulsifier was 0.08% (w/w) of the plasma obtained in the previous step, thus obtaining the emulsified plasma.

(7) The emulsified plasma was concentrated through nanofiltration by using a membrane with molecular weight of 200 to obtain concentrated plasma, wherein the volume ratio of the concentrated plasma vs filtrate water was 1:3.3, and most of the water and salts was removed, thus obtaining the concentrated plasma liquid.

(8) The concentrated plasma liquid was spray-dried, wherein the inlet air temperature was controlled at 220~230° C., and the outlet air temperature was controlled at 80~85° C., thereby obtaining the low ash poultry blood plasma protein powder, i.e. plasma protein powder 4.

As a result, using the above method, the indexes of the obtained plasma protein powder are shown in Table 3:

TABLE 2

| Example | Poultry blood (ton) | Anti-coagulant (kg) | Added decalcifying agent amount (w/w) | ultrafiltration membrane (molecular weight)(*$10^4$) | emulsifier agent (amount, w/w) | nanofiltration membrane (molecular weight) |
|---|---|---|---|---|---|---|
| 2 | 5 | Sodium citrate (60) | sodium carbonate 0.1% | 50 | Fatty acid monoglyceride (0.02%) | 1000 |
| 3 | 20 | Sodium citrate (150) | sodium carbonate 0.04% | 40 | Sorbitol ester (0.01%) | 200 |

EXAMPLE 5

Preparation of Poultry Blood Plasma Protein Powder 4

(1) 5 kg of anticoagulant (sodium citrate) and 40 kg of water were mixed to prepare the aqueous anticoagulant solution, and the aqueous anticoagulant solution was added

TABLE 3

| Protein | IgY | Ash | Moisture | Salt |
|---|---|---|---|---|
| 76% | 16.1% | 9.7% | 8.1% | <2% |

EXAMPLE 6

Preparation of Poultry Blood Plasma Protein Powder 5

(1) 8 kg of anticoagulant (sodium citrate) and 64 kg of water were mixed to prepare the aqueous anticoagulant solution, and the aqueous anticoagulant solution was added into 1 ton of chicken blood with stirring, so that the aqueous anticoagulant solution was sufficiently mixed with poultry blood to homogeneity.

(2) After collecting the anticoagulated poultry blood from the blood pool, the poultry blood was filtered through filter bag to remove impurities such as hair, stones and the like, and then was centrifuged by using blood tube centrifuge (11000 rpm/min), so as to obtain light liquid, i.e., the plasma liquid.

(3) 0.4 kg of ammonium carbonate and 0.4 kg of sodium carbonate were dissolved into 4 kg of water, thereby making the aqueous decalcification solution, and the solution was slowly added into the plasma liquid, wherein the amount of added decalcifying agent was 0.08% (w/w) of the plasma liquid obtained in the previous step, and the resulting mixture was stirred for 1 hour for precipitation reaction.

(4) Upon precipitation reaction, plasma reaction liquid was centrifuged by a disc centrifuge (11000 rpm/min) for removing the precipitate, thus obtaining decalcified plasma liquid.

(5) The decalcified plasma liquid was subjected to ultrafiltration using a filter membrane with molecular weight of 400,000 to remove fibrinogen and most of oil, thereby obtaining the plasma filtrate.

(6) Emulsifier (sorbitol ester: fatty acid monoglyceride=1:1) was added into the plasma filtrate to emulsify residual oil. The amount of added emulsifier was 0.08% (w/w) of the plasma obtained in the previous step, thus obtaining the emulsified plasma.

(7) The emulsified plasma was concentrated through nanofiltration by using a membrane with molecular weight of 200 to obtain concentrated plasma, wherein the volume ratio of the concentrated plasma vs filtrate water was 1:3.1, and most of the water and salts were removed, thus obtaining the concentrated plasma liquid.

(8) The concentrated plasma liquid was spray-dried, wherein the inlet air temperature was controlled at 220~230° C., and the outlet air temperature was controlled at 80~85° C., thereby obtaining the low ash poultry blood plasma protein powder, i.e. plasma protein powder 5.

As a result, using the above method, the indexes of the obtained plasma protein powder are shown in Table 4:

TABLE 4

| Protein | IgY | Ash | Moisture | Salt |
|---------|------|-------|----------|-------|
| 73% | 15.5% | 12.1% | 8.2% | <2.2% |

Example 6 Feeding Test

Certain amount of poultry blood protein powder was added into feed, and the effects on the content of immunoglobulin (IgG) content and feed to gain ratio for rearing piglets were compared between the group with poultry blood protein powder and the group without poultry blood protein powder.

Specific Methods:

Test group: the low ash poultry plasma protein powder prepared in any one of examples 1-5; added amount: 0.4% (w/w, determined by the total weight of the feed)

Control group: soy protein concentrate; added amount: 0.4% (w/w, determined by the total weight of the feed)

Piglet age: 28 days weaned piglets

Feeding days: two weeks

The experimental results were shown in Table 5.

TABLE 5

| group | Test group (poultry plasma protein powder) | Control group: soy protein concentrate |
|-------|-------|-------|
| Number of animals | 36 | 36 |
| IgG (g/L) at end | 23.90 ± 6.70 | 18.88 ± 2.79 |
| feed to gain ratio at end | 1.31 ± 0.05 | 1.40 ± 0.05 |

In summary, the poultry plasma protein powder can significantly improve the content of piglet immunoglobulin.

COMPARATIVE EXAMPLE 1 AND COMPARATIVE EXAMPLE 2

Relevant Indexes of Poultry Blood Plasma Protein Powder Produced by Ultrafiltration Membranes With Different Molecular Weight The preparation method was the same as Example 1, except that:

In step (5) of comparative example 1, an ultrafiltration membrane with molecular weight of 200,000 was used for ultrafiltration.

In step (5) of comparative example 2, an ultrafiltration membrane with molecular weight of 1,000 was used for ultrafiltration.

The comparison results of relevant indicators of poultry blood plasma protein powder produced by different molecular weight ultrafiltration membrane are shown in Table 6.

TABLE 6

| | Membrane molecular weight ($*10^4$) | Poultry plasma protein powder yield (From the filtrate after ultrafiltration) | Fiber protein powder purity (Retentate from after ultrafiltration) |
|---|---|---|---|
| Example 1 | 40 | 93% | 81% |
| Comparative example 1 | 20 | 82% | 43% |
| Comparative example 2 | 0.1 | 0.1% | 6% |

The results showed: the yield of the poultry blood plasma protein powder produced in example 1 significantly increased, and comparing with the "ultrafiltration membrane with molecular weight of 20 or 1000", the yield of the poultry blood plasma protein powder produced in example 1 increased at least 11%.

COMPARATIVE EXAMPLE 3

The preparation method was the same as Example 1, except that:

No decalcifying agent (step (3) and step (4) in example 1 were not present), or emulsifier was added in comparative example 3 (i.e. step (6) in example 1 was not present).

COMPARATIVE EXAMPLE 4

The preparation method was the same as Example 1, except that:

No decalcifying agent was added in comparative example 4 (i.e. step (3) and step (4) in example 1 were not present).

Compared with comparative example 3, in comparative example 4, step (6) of example 1 was added between step (5) and step (7) of comparative example 3:

(6) Emulsifier (sorbitol ester) was added into the plasma filtrate, to emulsify residual oil. The amount of added emulsifier was 0.1% (w/w) of the plasma obtained in the previous step, thus obtaining the emulsified plasma.

The effects of decalcifying agent and emulsifier on nanofiltration results and energy consumption were shown in Table 7.

TABLE 7

| | decalcifying agent | emulsifing agent | Concentrate/ filtrate (v/v) | Drying energy saving (Yuan/ton of poultry plasma protein powder) |
| --- | --- | --- | --- | --- |
| example 1 | with | with | 1:3 | 520 |
| Comparative example 3 | without | without | 1:2 | 0 |
| Comparative example 4 | without | with | 1:2.7 | 400 |

Results:

(i) According to the results in Table 7, taking "processing one ton of chicken plasma" as an example:

In example 1, 750 kg of salt and water can be removed, to produce 250 kg of chicken blood plasma concentrate;

In comparative example 4, about 703 kg of salt and water can be removed, to produce about 297 kg of chicken blood plasma concentrate;

In comparative example 3, 670 kg of salt and water can be removed, to produce 330 kg of chicken blood plasma concentrate.

From the comparison results, it is shown that: compared with comparative example 3 or comparative example 4, the volume of the concentrated liquid obtained in example 1 through nanofiltration was significantly reduced.

(ii) As shown in Table 7, when nanofiltration concentrate was further dried:

Compared with comparative example 3, can save 520 yuan/ton of poultry plasma protein powder can be saved in example 1;

Compared with comparative example 4, 120 yuan/ton of poultry plasma protein powder can be saved in example 1;

Comparison of the results showed that: compared with comparative example 3 or 4, energy consumption for the further drying process in example 1 was greatly reduced, significantly cutting the economic cost.

1. By using precipitation, ultrafiltration and emulsification process to solve the problems, such as high blood viscosity of poultry blood and unsuitability for nanofiltration treatment and so on, the method in the present invention facilitates subsequent nanofiltration operations, and significantly improves the preparation of plasma protein powder.

2. The method of the present invention can not only fill the gap in demand for protein feed, but also achieve a reasonable use of waste resources. The breakthrough and innovation in the poultry blood processing technology according to the present invention provide technical support for large-scale development and utilization of poultry blood.

All literatures mentioned in the application are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A preparation method for low-ash poultry plasma protein powder, comprising:
   (a) mixing poultry blood with an anticoagulant and obtaining an anti-coagulated whole blood;
   (b) centrifuging the anti-coagulated whole blood obtained in step (a) and collecting a light liquid to obtain a plasma liquid;
   (c) adding a decalcifying agent into the plasma reaction liquid obtained in step (b), and conducting precipitation reaction, so as to obtain a plasma reaction liquid containing a precipitate wherein the decalcifying agent contains a water-soluble carbonate, and the amount of the decalcifying agent being 0.01-0.5% (w/w) of the plasma liquid obtained in step (b);
   (d) removing the precipitate by centrifuging the plasma reaction liquid obtained in step (c), so as to obtain a decalcified plasma liquid;
   (e) ultra-filtering the decalcified plasma liquid obtained in step (d) using an ultrafiltration membrane, so as to obtain an ultrafiltration-processed plasma liquid, wherein the ultrafiltration membrane being an ultrafiltration membrane with a molecular weight cut-off of 300,000-500,000 Dalton;
   (f) adding an emulsifier to the ultrafiltration-processed plasma liquid obtained in step (e), so as to obtain an emulsified plasma liquid, wherein the amount of the emulsifier being 0.01-0.5% (w/w) of the ultrafiltration-processed plasma liquid obtained in step (e); and the emulsifier contains at least one selected from the group consisting of fatty acid monoglyceride, sorbitol ester, and soybean phospholipid;
   (g) subjecting the emulsified plasma liquid obtained in step (f) to nanofiltration to obtain a plasma concentrate and a filtrate, wherein the nanofiltration being performed using a nanofiltration membrane with a molecular weight cut-off of 200-1000 Dalton, the volume ratio of the plasma concentrate over the filtrate being 1: 2-4, and collecting the plasma concentrate; and
   (h) drying the plasma concentrate obtained in step (g), so as to obtain a poultry plasma protein powder.

2. The method of claim 1, wherein the poultry blood comes from one or more of chicken, duck, and goose.

3. The method of claim 1, wherein, in step (a), the anticoagulant is sodium citrate, and the amount of the anticoagulant is 0.1~5% (w/w) of the total blood.

4. The method of claim 1, wherein
   the centrifugation process in step (b) uses a tube centrifuge; and/or
   the centrifugation process in step (d) uses a disc centrifuge.

5. The method of claim 1, wherein
   drying the plasma concentrate obtained in step (g) is conducted with a spray drying, wherein an inlet air temperature is 220° C.~230° C., and an outlet air temperature is 80° C.~85° C.

6. The method of claim 1, wherein
   the water-soluble carbonate contains at least one selected from the group consisting of sodium carbonate, potassium carbonate, and ammonium carbonate.

7. A preparation method for a granular feed, comprising:
   (i) preparing a poultry plasma protein powder by using the preparation method according to claim 1; and
   (ii) mixing the poultry plasma protein powder with a component containing at least one selected from the group consisting of cereal, maize, soybean and whey to obtain the granular feed.

8. The method of claim 1, wherein, in step (e), the ultrafiltration membrane is an ultrafiltration membrane with a molecular weight cut-off of 350,000-500,000 Dalton.

9. The method of claim 1, wherein, in step (e), the ultrafiltration membrane is an ultrafiltration membrane with a molecular weight cut-off of 400,000 Dalton.

10. A poultry plasma protein powder prepared by the method of claim 1, wherein the poultry plasma protein powder has a content of protein being ≥70%, an immunoglobulin content being ≥14%, and an ash content being ≤15%.

11. The poultry plasma protein powder of claim 10, wherein the content of protein is 70~78%, the immunoglobulin content is 14~30%, and the ash content is 8~15%.

12. A preparation method for feed composition or food composition, comprising mixing the poultry plasma protein powder of claim 10 with a component containing at least one selected from the group consisting of cereal, maize, soybean and whey, and thereby obtaining the feed composition or food composition.

* * * * *